March 9, 1943. G. A. WALLER 2,313,708
OVERLOAD CLUTCH
Filed March 6, 1942 2 Sheets-Sheet 2
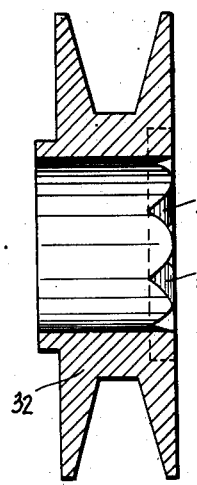
Fig. 5.
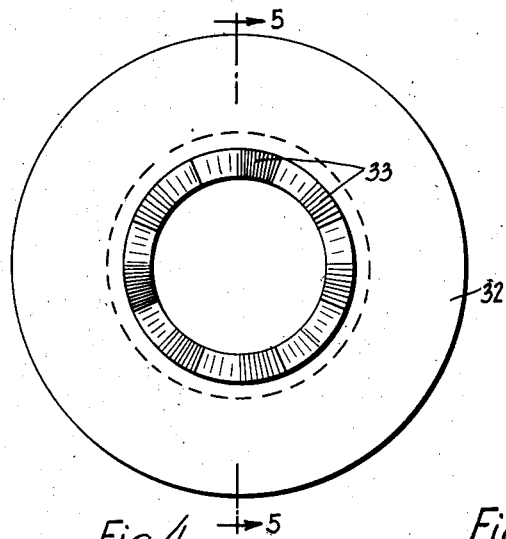
Fig. 4.
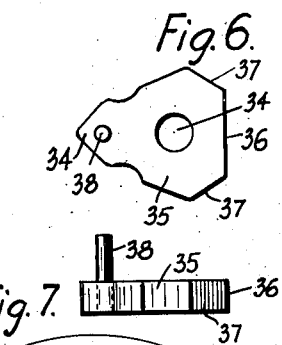
Fig. 6.
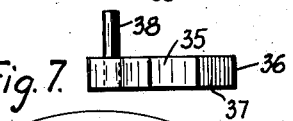
Fig. 7.
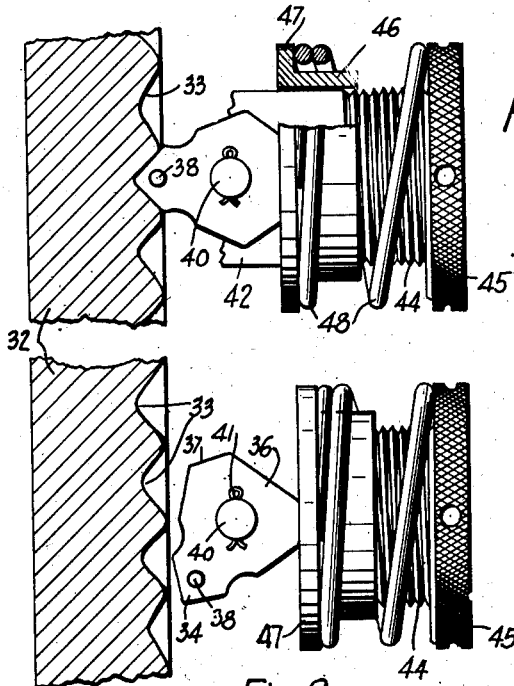
Fig. 8.
Fig. 9.
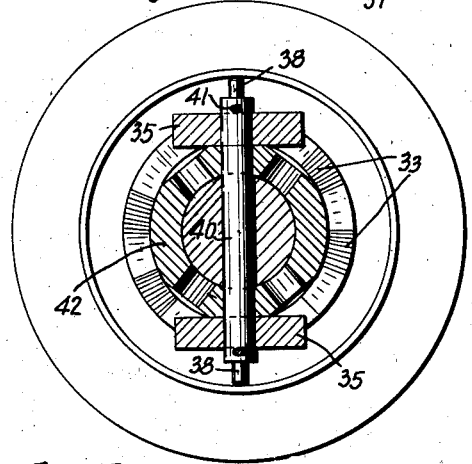
Fig. 10.
INVENTOR.
GEORGE A. WALLER.
BY
ATTORNEY.

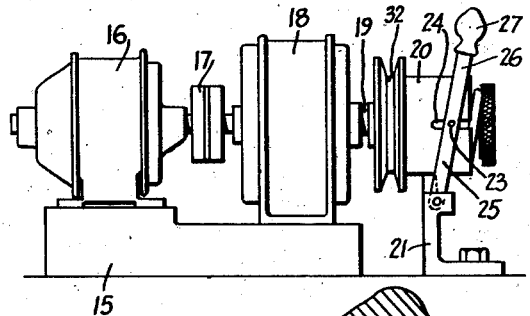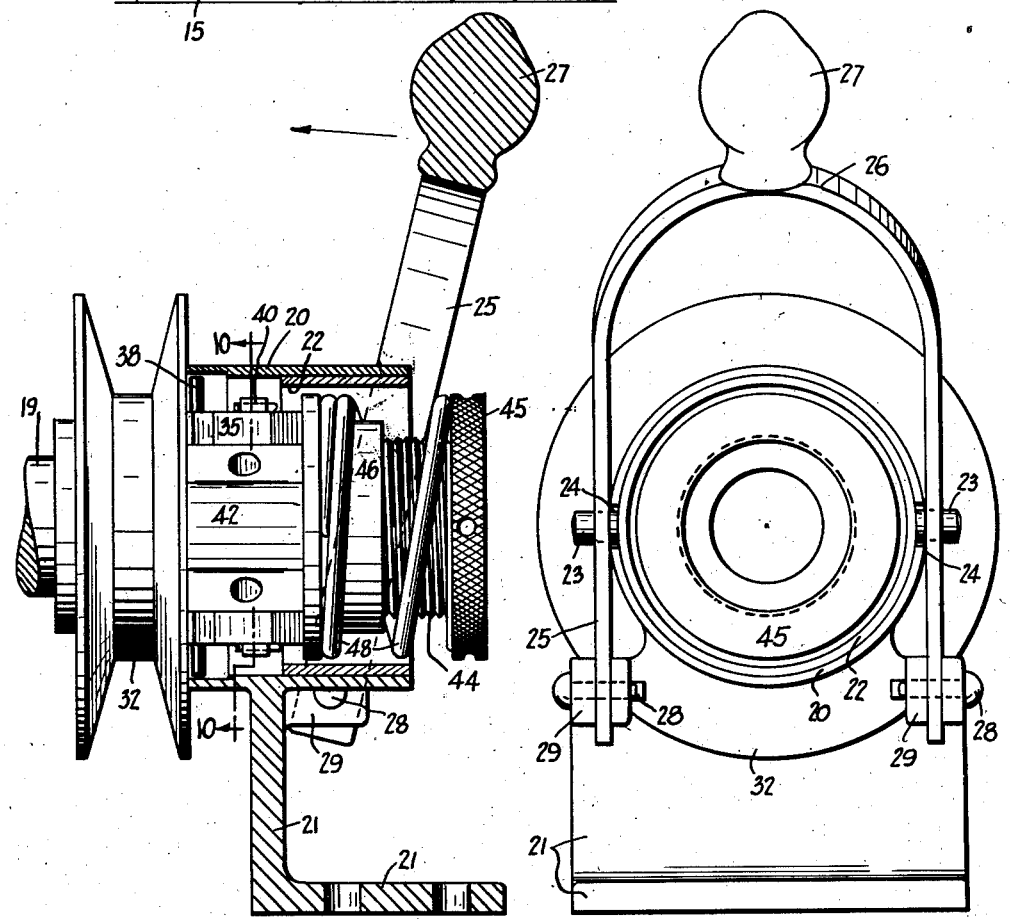

Patented Mar. 9, 1943

2,313,708

UNITED STATES PATENT OFFICE 2,313,708

OVERLOAD CLUTCH

George A. Waller, Mount Vernon, N. Y.

Application March 6, 1942, Serial No. 433,647

2 Claims. (Cl. 192—56)

This invention relates to clutch disengaging devices disposed between driving and driven parts of mechanisms, and adapted to operate automatically in the event of an overload occurring in transmission of power to a driven member.

Various devices for obtaining similar results are known, their safety feature usually consisting of members adapted to become sheared when an overload occurs, entailing loss of time and material in removal and substitution of the sheared part.

It is therefore an object of this invention to provide an overload release clutch void of frangible parts and manually resettable after operation.

A further feature is in the provision of means to adjust the degree of torque required to operate to such as may be required.

Another purpose is to produce a device for this purpose, essentially simple in design, positive in operation, inexpensive to construct, and easy to apply.

These and analogous objects are accomplished by the novel construction, combination and arrangement of parts hereinafter described and illustrated in the accompanying drawings, constituting a graphical component of this disclosure, and in which:

Figure 1 is a side elevational view of a conventional type of power transmission including an application of an embodiment of the invention.

Figure 2 is a front elevational view of the release clutch, drawn to an enlarged scale.

Figure 3 is a partial side elevational, partial longitudinal sectional view of the same.

Figure 4 is a side view of the clutch driven pulley in detail.

Figure 5 is a transverse sectional view taken on line 5—5 of Figure 4.

Figure 6 is a detail plan view of one of the pawls.

Figure 7 is an edge view of the same.

Figure 8 is a schematic view of the device, showing the pawls in an operative, driving position.

Figure 9 is a similar view of the same parts, but showing the pawls in a disengaged, inoperative position.

Figure 10 is a transverse sectional view taken on line 10—10 of Figure 3.

Referring to the drawings in greater detail, the numeral 15 designates a pedestal on which is mounted a prime mover, as a motor 16.

The motor is connected by a clutch 17 with a speed reducing mechanism 18, its shaft 19 passing into a head 20 mounted on a support bracket 21 bolted to the floor on which the base 15 rests.

The head 20 is substantially a cylindrical shell in which is slidable, at its outer portion, a sleeve 22, open at both ends, as best seen in Figure 3.

Set at diametrically opposite points in the sleeve 22 are pins 23, freely movable in slots 24 in the head 20; these pins engage in appropriate openings in the side elements 25 of a forked yoke 26, having, at its upper closed end, a manually operable knob 27.

The lower ends of the yoke sides 25 are pivoted on pins 28 set in bifurcated lugs 29 formed as parts of the bracket 21.

Rotatable on the outer portion of the shaft 19 is a pulley 32 having in its opposite side, adjacent its bore, a plurality of angularly bottomed recesses 33.

Engageable in diametrically opposed pairs of these recesses are the angular ends 34, of pawls 35 provided, directly opposite their points with flat surfaces 36, disposed in planes at right angles to the longitudinal axis of the pawls, and at angles of 45 degrees from the surfaces 36 are flats 37.

Set in the outer sides of the pawls, adjacent their points, are pins 38 for a purpose further on described.

The pawls 35 are rotatably mounted on a spindle 40 provided with pins 41 and passing diametrically through the shaft 19 and a cylindrical block 42 extending into an annular recess in the pulley 32.

The opposite, front end of the block 42 is in some way connected with a hollow screw 44 having a knurled ring nut 45 threaded on the end thereof. Loosely mounted on the block 42 is a sleeve 46 having a rear flange 47 against which the flats of the pawls abut.

Surrounding the sleeve 46 and screw 44 is a strong helical compression spring 48 exerting pressure between the ring nut 45 and flange 47, thus pressing the pawls firmly against the recesses in the pulley 32 and causing it to normally rotate, all these several parts being housed within the casing 20, except the pulley.

By turning the ring nut 45 it will be apparent that the pressure of the spring 48 may be modified and hence the load that can be transmitted to the pulley when the parts are in the position shown in Figure 8.

If an overload occurs, the pawls will turn on the axis of the spindle 40 and be held out of engagement with the pulley as shown in Figure 9.

To reset the device the yoke 26 is swung rearwardly, as indicated by the arrow in Figure 3, causing the sleeve 22 to contact the pins 38, thereby turning the pawls again into operative position.

Having thus described the invention and set forth the manner of its construction and application, what is claimed as new and sought to secure by Letters Patent, is:

1. An overload release clutch comprising in combination with a driving shaft, and a pulley rotatable thereon, a plurality of angular recesses in the side of said pulley adjacent its bore, a pair of oppositely disposed pawls egageable in said recesses, a block driven by said shaft on which said pawls are pivotally mounted, a spring pressed flange against which said pawls abut at their outer ends, an adjustable spring to press said flange against the pawls, said spring yielding under abnormal pressure to release the pawls, and means to reset the pawls after displacement.

2. An overload release clutch comprising in combination with a driving shaft and a pulley rotatable thereon, a plurality of angular recesses in the side of said pulley adjacent its bore, a pair of oppositely disposed pawls engageable in said recesses, a block driven by said shaft on which said pawls are pivotally mounted, an annular flange free on said shaft in abutting relation to said pawls, a spring exerting pressure against said flange, means for varying the effect of the spring, and means for resetting the pawls when moved out of operative position.

GEORGE A. WALLER.